May 14, 1957  B. M. BAKER  2,792,562
HORIZONTAL SEISMOMETER
Filed July 20, 1954  2 Sheets-Sheet 1

INVENTOR.
Buford M. Baker
BY
Stevens, Davis, Miller and Mosher
ATTORNEYS

May 14, 1957

B. M. BAKER 2,792,562

HORIZONTAL SEISMOMETER

Filed July 20, 1954

INVENTOR.
*Buford M. Baker*
BY
*Stevens, Davis, Miller & Mosher*
ATTORNEYS

United States Patent Office 2,792,562
Patented May 14, 1957

2,792,562

HORIZONTAL SEISMOMETER

Buford M. Baker, Houston, Tex., assignor to Texas Instruments Incorporated, Dallas, Tex., a corporation of Delaware Application July 20, 1954, Serial No. 444,534

12 Claims. (Cl. 340—17)

This invention relates to geophysical surveying and more specifically to a seismometer adapted for making seismic surveys either on dry land, ice, snow or water. The seismometer is especially adapted for incorporation into a streamer for towing behind a ship when surveying over water covered areas and for work on dry land, snow or ice employing seismometers in a spread.

The type of seismometer most generally used in seismic surveying, whether on dry land, snow, ice or over water covered areas, has been the velocity type seismometer. These seismometers are normally constructed with their major response in a vertical direction since, in reflection seismic surveying, the compressional waves reflected from the underground horizons travel either in a vertical direction or have their major component of force in a vertical direction. In dry land, snow or ice surveying, a certain amount of care is required to plan seismometers in an upright and preferably level position to insure that all available reflections will be received. Surveying over water covered areas presents even greater difficulties because of the accessory equipment required to maintain the seismometers in an upright position. Thus, when the seismometers are attached externally to the towing cable, floats and trunnions or other self-righting means must be provided which increase the towing force required to pull the spread through the water and complicates handling of the apparatus. If the seismometers are incorporated into a cable of the streamer type, gimbals and trunnions are necessary to permit the seismometers to remain vertical as the cable twists and turns in the water. The gimbal construction is not only bulky and difficult to handle but requires the use of some type of slip ring construction in order to feed the output signals from the seismometers to the leads connecting the seismometer with the amplifying and recording equipment located aboard the towing ship.

Recognizing the expense and additional equipment associated with the use of conventional velocity type seismometers, seismometers with a horizontal axis have been devised to overcome these disadvantages. One such type of seismometer as disclosed by the prior art comprises a seismometer housing which is cylindrically symmetrical about a horizontal axis and encloses a magnetic structure consisting of an annular permanent magnet and a pole piece of magnetic material placed on either side of the magnet to define an annular gap whose plane is substantially vertical. A coil is supported within this gap by an elastic member fixed at the horizontal axis of the seismometer. Because the magnet and all other components of this type of seismometer are symmetrical about a horizontal axis, the seismometer may thus be placed in any position on the ground or incorporated into a spread and towed behind a ship in any horizontal position without affecting the symmetry of the components or its response to vertically traveling waves. In the operation of this seismometer, however, it is essential that the mean radius of the coil be either greater or smaller than the mean radius of the gap to insure that the upper and lower halves of the coil are in magnetic fields of different strength. This follows by reason of the fact that the flux from the annular magnet through both the upper and lower halves of the coil is in the same direction and consequently, the voltage induced in the upper half is opposed by the voltage induced in the lower half. Therefore, unless the coil is unsymmetrically positioned so that the upper and lower halves of the coil are in magnetic fields of different strength, the net output of the seismometer is zero. Even at the optimum position, however, the maximum output of the seismometer can only be the net difference between the voltages generated in the two halves.

The seismometer of the present invention is a horizontal type seismometer but it avoids the fundamental limitation in output signal of the prior art device. The housing of the seismometer is preferably cylindrical and contained within the housing are two permanent magnets with the polarity of the magnetic path above the horizontal axis opposite in polarity from the polarity of the magnetic path below the horizontal axis. The permanent magnets are supported from a freely rotatable member eccentrically mounted so that due to the effect of gravity, the magnetic structure will constantly maintain a vertical orientation regardless of the rotation of the housing. A gap symmetrical about the horizontal axis is provided in the magnetic flux path and a coil is positioned within this gap to receive generally equal amounts of flux in both the upper and lower halves of the coil. An elastic member is fixed at one end to the horizontal center line of the housing and supports a mass at its other end free to vibrate which may consist of either the coil or the magnetic structure. Thus, as the coil and the permanent magnet vibrate relative to each other in response to a movement of the housing, additive voltages are induced in the upper and lower halves of the coil and these signals fed to appropriate amplifying and recording equipment.

It is accordingly a primary object of this invention to provide a seismometer which is freely rotatable about a horizontal axis and does not require care in positioning the seismometer on dry land, ice or snow or the use of gimbals or other devices to orient the seismometer in a position for maximum response when surveying over water covered areas.

It is another primary object of this invention to provide a seismometer in which the signal output is the sum of the voltages induced in the upper and lower halves of the coil rather than a signal output which is the net difference between the voltages induced in the upper and lower halves of the coil. It is a still further object of this invention to provide a simple, rugged and inexpensive seismometer construction and a seismometer sufficiently sensitive and small enough in diameter to be incorporated into a streamer cable for towing behind a ship.

The above objects will be more fully appreciated and other objects will become known from the following discussion when taken in conjunction with the drawings in which.

Figure 1:
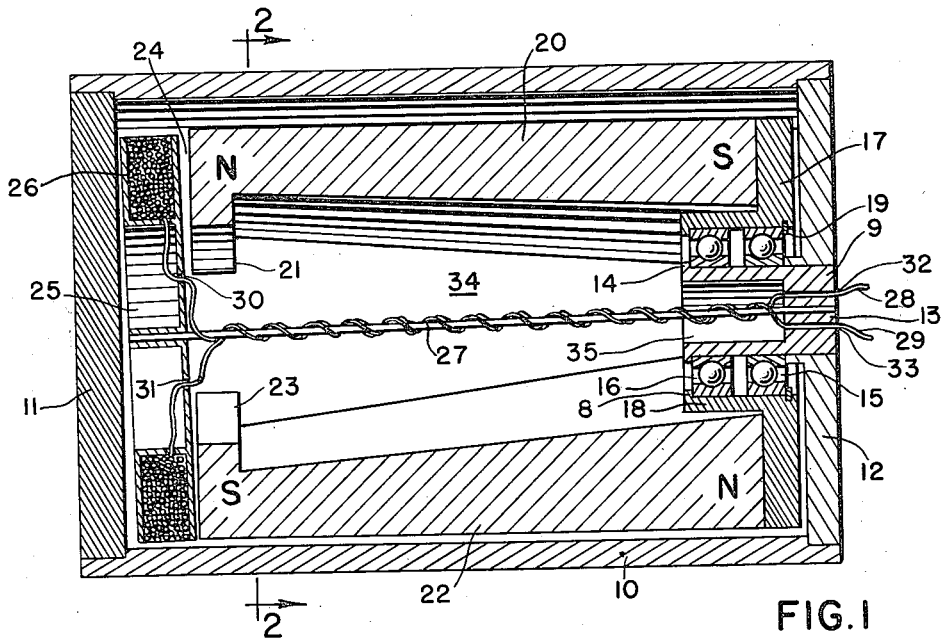
Figure 1 is a cross-sectional view of one embodiment of the invention wherein the coil is the moving element.

Referring now to Figure 1, one embodiment of the seismometer of this invention is shown comprised of an external housing 10, preferably in the form of a horizontal cylindrical shell, and end closure members 11 and 12. Housing 10 and end closure member 12 are made from some non-magnetic material such as aluminum or brass while end closure member 11 forms a part of the magnetic path and is composed of a ferromagnetic material. End closure member 12 is drilled with a circular opening located at the horizontal centerline of the housing and fixed within this opening is the closed end 9 of a support member 13. Support member 13 is cylindrical in form characterized by the above mentioned closed end 9, an open cylindrical recess section designated by the numeral 35, and a lip 14 extending around the outside open end of the cylindrical recess section 35. The inner race of a ball bearing assembly 16 forms a close fit with the outside surface of support member 13 and bears against the extended lip 14. Axially spaced from bearing assembly 16 is another ball bearing assembly 15, the inner race of which likewise forms a close fit with the outside surface of support member 13. Hub 18, a part of a circular support member 17, is located off-center on member 17 by the distance shown in Figure 2 between the center line of the magnetic structure and the center line of the horizontal axis of the seismometer. The inside surface of hub 18 fits over the outer races of ball bearing assemblies 15 and 16. Hence, circular support member 17 is rotatably supported with respect to the seismometer housing 10. An inwardly extending lip 8 of hub 18 and a flat circular snap ring 19 fitted within a groove milled in hub 18 bear against the outer races of bearing assemblies 16 and 15, respectively, thus preventing axial movement of the circular support 17. Circular support member 17 in the circumstances of the invention is composed of a ferro-magnetic material.

Figure 3:
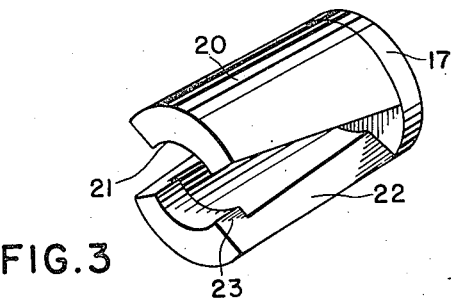
Figure 3 is a perspective view showing one form of the permanent magnet structure for the seismometer of Figure 1.
Figure 2:
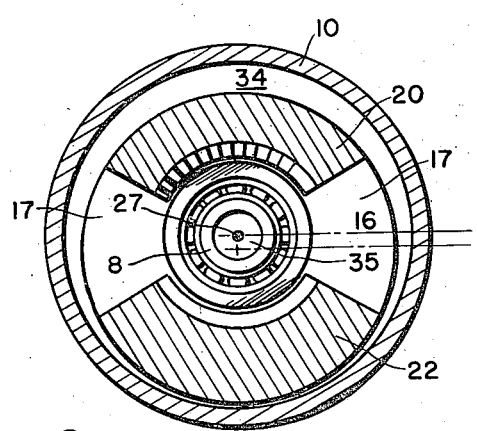
Figure 2 is a cross-sectional view of Figure 1 taken along lines 2—2.

As shown in the cross-section view Figure 2 and the perspective view Figure 3, two fan-shaped permanent magnets provide the flux source for the seismometer. The upper permanent magnet 20 is fixed at one end to circular support member 17 with its north pole extending away from the point of attachment. The north pole of magnet 20 is constructed with a downwardly extending portion 21 to present a substantially broad face in a vertical plane. The lower permanent magnet section 22 is fixed with its south pole extending away from the point of attachment to circular support member 17 and, like magnet 20 has a portion 23 extending upwardly to present a substantially broad face in a vertical plane. The axial length of the permanent magnets 20 and 22 is substantially equal and the free end of each terminates spaced from the end closure member 11 whereby a vertical and cylindrically symmetrical gap 24 is defined between the faces 21 and 23 of the magnets and member 11.

A coil 26, composed of a number of turns of small diameter wire, is wound on a coil form 25. As evident from Figure 1, the coil 26 and coil form 25 are elastically supported in gap 24 at the free end of a cantilever spring 27 which in turn is supported from the center of support 13 and, therefore, at the horizontal center line of the seismometer. Due to the force of gravity acting on the mass of the coil 26 and coil form 25 at the end of the cantilever spring, the center of coil 26 is below the centerline of the seismometer but because of the portions 21 and 23 of magnets 20 and 22, the coil halves remain in fields of equal magnetic strength. Leads 28 and 29 from coil 26 extend out through openings 30 and 31 in coil form 25 and, to prevent interference with any vibratory movement, are wound around cantilever spring 27 and brought to the outside of the seismometer through the insulated openings 32 and 33 in support member 13. Leads 28 and 29 are connected to amplifying and recording equipment, not shown, but which may be of any conventional type used in the art of seismic surveying. The interior of the seismometer is filled with some fluid such as oil in the area designated generally by the numeral 34 to dampen the vibration of coil 25. In the event it becomes desirable to provide for rotational damping against forces acting at right angles to the axial length of the seismometer, fins extending vertically upward and downward can be attached to the magnets 20 and 22 without interfering with the reception of vertically travelling reflected waves.

To summarize the salient features of the novel seismometer, a construction is shown in Figures 1, 2 and 3 wherein permanent magnet 20 is positioned with its north pole adjacent to the upper portion of coil 26 and permanent magnet 22 is positioned diametrically opposite from magnet 20, namely, with its south pole adjacent the lower portion of coil 26. Further, the magnets 20 and 22 are attached to a circular member 17 which is rotatably supported by means of a bearing arrangement located eccentrically on member 17. Therefore, the magnetic structure is self-orienting around the horizontal axis of the seismometer and will always maintain a flux relation of opposite polarity through the upper and lower portions of the coil regardless of the position of the seismometer on the ground or the twisting or turning of a streamer or seismic cable towing the seismometer when surveying over water covered areas. Since circular member 17 and end closure member 11 are composed of ferromagnetic material, the flux path in the seismometer then is from the north pole of magnet 20 across air gap 24, through the upper half of coil 26 to end closure 11, and from end closure 11 through the lower half of coil 26 to the south pole of magnet 22 and back through circular member 17 to the north pole of magnet 20.

Figure 4:
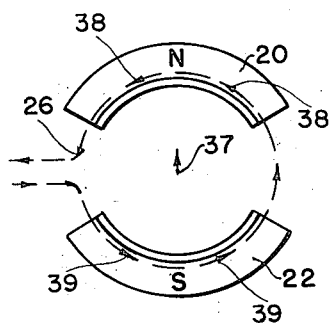
Figure 4 is a schematic representation of the voltages induced in the moving coil of Figure 1.

As a result of this construction, the seismometer produces output signals as represented schematically in Figure 4. The flux throught he upper half of coil 26 is from the north pole of permanent magnet 20 in a direction perpendicular to the plane of the paper and as coil 26 vibrates upward in the direction of arrow 37, lines of force are cut inducing a voltage in the upper half of the coil which flows in the direction of arrows 38. Simultaneously, the flux in the circuit through the lower half of coil 26 to the south pole of magnet 22 is from a direction perpendicular and towards the plane of the paper and, therefore, opposite from the flux through the upper half of coil 26. Since the flux is in the opposite direction but with coil 26 moving in the direction of arrow 37, the voltage induced is in the opposite direction as shown by arrows 39 with the result that the voltages flowing around the circular coil 26 add at the output of the seismometer. Of course, when coil 26 vibrates in a downward direction, the voltage induced in the coil will flow in a direction opposite to that indicated by the arrows 38 and 39. Further, since it is unnecessary for the coil halves to be located in magnetic fields of different strength to produce a net voltage output, the magnets 20 and 22 can be formed with the extended portions 21 and 23 respectively so that coil 26 is positioned at all times in fields of equal as well as maximum concentration as it vibrates in response to a vertically traveling wave.

Figure 5:
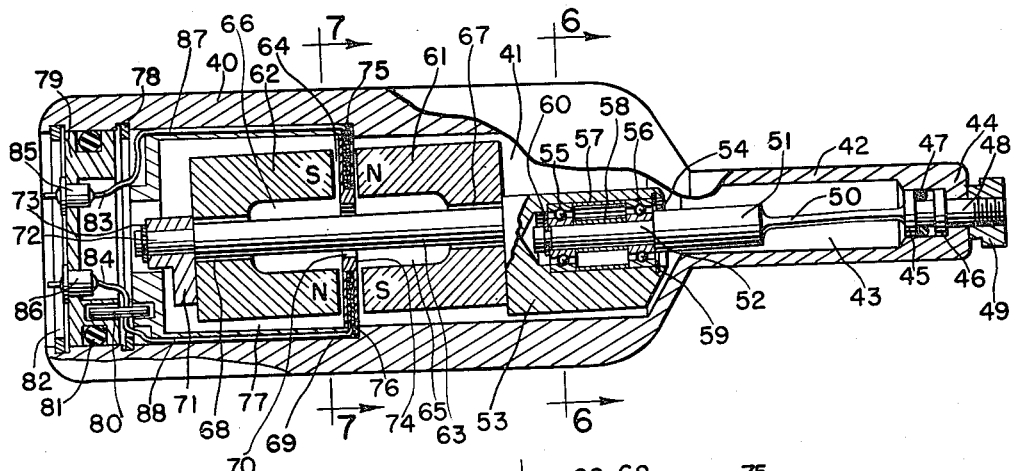
Figure 5 is a cross-sectional view of another embodiment of the invention in which the magnetic structure is the moving element.

Another embodiment of the present invention is shown in Figure 5 which is the converse of the previously described seismometer in that the magnetic structure is the vibrating member and the coil is the stationary member. The embodiment of Figure 5 is comprised of an external housing 40, preferably in the form of a horizontal cylindrical shell, with one end of the housing reduced in diameter to form a smaller diameter cylinder 42. Toward the end of cylinder 42, the inside diameter is reduced in two steps to provide a rigid support for the end of a cantilever spring 50 at the horizontal centerline of the seismometer. Two spaced circular discs 45 and 46 formed on spring 50 fit within the larger of the two circular areas in the end of cylinder 42 and the spring fixed at that point by a nut 49 threaded onto extension 48 received through the smaller of the circular areas drilled in end closure 44. An O-seal ring 47 positioned between the discs 45 and 46 provides a fluid tight closure for this end of the seismometer.

Figure 6:
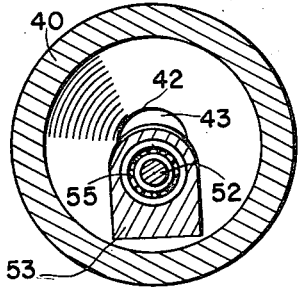
Figure 6 is a cross-sectional view of Figure 5 taken along the lines 6—6.

Cantilever spring 50, which is free to vibrate in the open cylindrical area 43 of cylindrical shell 42, increases to the diameter of section 51 and remains at this enlarged diameter as it extends into the enlarged area of hollow cylindrical shell 40. Section 51 is then turned down into a smaller diameter section 52 equal to the inside diameter of the inner races of ball bearing assemblies 55 and 56. The inner race of bearing assembly 56 bears against the shoulder provided by the reduction in diameter of section 52 from the diameter of section 51 and the inner race of ball bearing assembly 55 bears against a snap ring 60 inserted in a groove in section 52. Ball bearing assembly 56 is separated from ball bearing assembly 55 by an outer annular spacer ring 57 and an inner annular spacer ring 58. A hole 54 equal in diameter to the outer races of bearing assemblies 55 and 56 is drilled eccentrically in a block of non-magnetic material 53 which fits over the outer races of the ball bearings. A flat circular snap ring 59 inserted in a groove in block 53 bears against the outer race of bearing assembly 56 and prevents axial movement of the block 53. Thus, block 53 is rotatably supported from the cantilever spring 50 and because of the effect of gravity on its off-center mounting, orients itself around the horizontal axis of the seismometer with any rotation of the seismometer. The features described above are further illustrated in the cross-sectional view of the seismometer shown in Figure 6.

Figure 8:
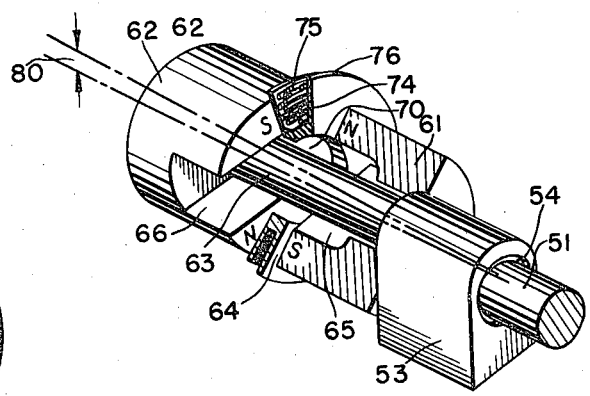
Figure 8 is a perspective view illustrating the moving magnetic structure and stationary coil arrangement of Figure 5.
Figure 7:
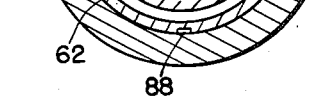
Figure 7 is a cross-sectional view of Figure 5 taken along the lines 7—7.

The construction and arrangement of the magnetic structure and its relation to the seismometer coil can be more clearly understood by considering the cross-sectional view of Figure 7 and the perspective view of Figure 8 along with Figure 5. Permanent magnet 61 is circular in cross-section and cast with a centrally located bore or opening 67 and an open area 65 separating the north and south poles of the magnet. Magnet 61 is fixed in some convenient manner to non-magnetic block 53 with its north pole in the upward position and its center line coaxial or in alignment with the horizontal center line of the seismometer. A shaft 63 is likewise fixed to the block 53 and extends axially through the opening 67. Another permanent magnet 62, cast with a centrally located bore or opening 68 and an area 66 separating its north and south poles, fits on the opposite end of shaft 63. A positioning block 71 fits over a turned down portion 72 of shaft 63 and is attached to permanent magnet 63 to support it in line with the horizontal center line of the seismometer and with its south pole adjacent to the north pole of magnet 61. Snap ring 73 fitted in a groove in shaft 72 and the shoulder formed by the change in diameter of shaft 63 prevent axial movement of magnet 62. When magnets 61 and 62 are in position on shaft 63, the magnets are separated by a substantially vertical and cylindrically symmetrical gap 64. A circular coil 75, consisting of a number of turns of wire and wound on a coil form 74, is positioned in gap 64. A central opening 70 in coil form 74 permits shaft 63 and thus the magnetic structure as a whole to vibrate in response to a vertically traveling wave. One flange 76 of coil form 74 has a larger diameter than the other flange and is equal to the inside diameter of shell 40 indicated by the numeral 69. This diameter is greater than the immediately adjacent inside diameter and thus, a support shoulder is provided for one side of the coil form flange 76. The other side of flange 76 is supported by a cylindrical sleeve 77.

The components effecting a closure of the open end of cylindrical shell 40 consists of first, a circular ring 78 which fits within a groove in shell 40 and bears against sleeve 77 to hold it in position against flange 76 of coil form 74. Then, the open end is closed by a plate 79 which is aligned by bar 80 and held in position by a circular snap ring 82 inserted in a groove in the cylindrical housing. An O-seal ring 81 seals the end of the cylinder 40 against leakage of the damping fluid placed in the open areas indicated by the numerals 41 and 43. Leads 83 and 84 from coil 75 are carried in grooves 87 and 88 respectively formed in sleeve 77 and led outside of the seismometer through the insulated eyelets 85 and 86 fixed to and extending through end closure member 79. In operation, the leads 83 and 84 are connected to amplifying and recording equipment, not shown, which may be of any conventional type used in seismic surveying.

Thus, a seismometer has been described in which the coil is held stationary and the magnetic structure vibrates but which embodies all of the features described in connection with the seismometer of Figure 1. As shown in Figure 5 and Figure 8, the flux path is from the north pole of magnet 61 across the upper half of coil 75 to the south pole of magnet 62. From there the flux travels down to the north pole of magnet 62, across the lower half of coil 75 in a direction opposite to the flux in the upper half of the coil, and from there to the south pole of the permanent magnet 61. The gravitational pull on the eccentrically but rotatably mounted weight 53 causes it to orient itself around the horizontal axis of the seismometer and, since the magnetic structure is fixed to weight 53, the magnets also rotate and maintain the same polarity relation regardless of the rotation of the seismometer. With the magnetic poles so arranged, the voltages induced in the upper half and the lower half of coil 75 flow in opposite directions in each half and consequently, add together at the output of the seismometer. The operation of the seismometer is enhanced by the additional feature provided of supporting the resilient rod 50 from the extended cylinder 42. By using the longer spring 50, the magnetic structure will vibrate in an arc with very little angularity and thus, the width of gap 64 can be reduced to provide a seismometer with greater sensitivity. The vibration of the magnetic structure is damped by filling the areas 41 and 43 with some fluid such as oil. If it is desired to provide rotational damping against forces acting at right angles to the length of the seismometer, vertically extending fins can be attached to the eccentrically mounted block 53 without interfering with the reception of reflected seismic waves.

The seismometer of the present invention has been described with particularity with respect to each of two specific embodiments shown. It is to be understood, however, that various modifications and changes will be obvious to those skilled in the art which changes, if made, would not depart from the spirit and scope of the invention. Therefore, the invention should not be considered as limited to the specific details described and shown, but should be determined in the light of the appended claims.

What is claimed is:

1. A seismometer comprising an elongated housing, a permanent magnet, means mounting said permanent magnet eccentrically within said housing for free rotation so that gravitational pull on said permanent magnet will maintain a substantially fixed vertical orientation of said permanent magnet, a coil lying in a vertical plane axially separated from the end of said permanent magnet by an air gap whereby flux from said permanent magnet passes through the upper and lower halves of said coil in opposite directions, and means resiliently mounting one of said coil and said permanent magnet for vibration in a vertical plane.

2. A seismometer comprising an elongated housing, a permanent magnet, means mounting said permanent magnet eccentrically within said housing for free rotation so that gravitational pull on said permanent magnet will maintain a substantially fixed vertical orientation of said permanent magnet, a coil lying in a vertical plane axially separated from the end of said permanent magnet by an air gap, and means resiliently mounting said coil for vibration in a vertical plane.

3. A seismometer comprising an elongated housing, a permanent magnet, means mounting said permanent magnet eccentrically within said housing for free rotation so that gravitational pull on said permanent magnet will maintain a substantially fixed vertical orientation of said permanent magnet, a coil lying in a vertical plane axially separated from the end of said permanent magnet by an air gap, and means resilient mounting said permanent magnet for vibration in a vertical plane.

4. A seismometer comprising an elongated housing, a magnetic structure including a permanent magnet and a support member therefor, means mounting said support member eccentrically within said housing for free rotation so that gravitational pull on said magnetic structure will maintain a substantially fixed vertical orientation of said magnetic structure, a coil lying in a vertical plane axially separated from the end of said permanent magnet by an air gap, and means resiliently mounting one of said coil and said magnetic structure for vibration in a vertical plane.

5. A seismometer comprising an elongated housing, an elongated magnetic structure including an elongated permanent magnet and a support member therefor joined to one end of said permanent magnet, means mounting said support member eccentrically to one end of said housing for free rotation so that gravitational pull on said magnetic structure will maintain a substantially fixed vertical orientation of said magnetic structure, a coil lying in a vertical plane axially separated from the free end of said permanent magnet by an air gap, a cantilever spring fixed at one end to said housing and at the other end to said coil whereby said coil is adapted to vibrate in a vertical plane.

6. A seismometer as defined in claim 5 wherein said means mounting said support member is comprised of a ball bearing assembly the inner race of which is fixed to said housing and the outer race of which is fixed to said support member.

7. A seismometer as defined in claim 5 wherein the free end of said permanent magnet and the other end of said housing define therebetween an air gap the plane of which is substantially vertical and in which is mounted said coil.

8. A seismometer as defined in claim 5 wherein said magnetic structure includes two permanent magnets each joined at one end to said support member and on opposite sides of the axis of said magnetic structure with one of said magnets presenting a north pole at its free end and the other of said magnets presenting a south pole at its free end whereby the flux path through the top and bottom of said coil is in opposite directions.

9. A seismometer as defined in claim 5 whereby the leads from said coil are wound around said spring attached at one end to said housing and are brought through said housing adjacent the point of attachment of said spring.

10. A seismometer comprising an elongated housing, a magnetic structure including a permanent magnet and a support member therefor, means mounting said support member eccentrically within said housing for free rotation so that gravitational pull on said magnetic structure will maintain a substantially fixed vertical orientation of said magnetic structure, a coil fixed in a vertical plane axially separated from the end of said permanent magnet by an air gap, and a spring attached at one end to said housing and at its other end to said magnetic structure whereby said magnetic structure is adapted to vibrate in a vertical plane.

11. A seismometer as defined in claim 10 wherein said means mounting said support member includes a ball bearing assembly the inner race of which is fixed to said spring and the outer race of which is fixed to said support member.

12. A seismometer as defined in claim 10 wherein said magnetic structure is further characterized by a shaft fixed at one end to said support member, and a second permanent magnet mounted on said shaft on the opposite side of said coil axially separated therefrom, said permanent magnets being arranged with the north pole of each magnet adjacent the south pole of the other magnet.

References Cited in the file of this patent

UNITED STATES PATENTS

| | | |
|---|---|---|
| 2,074,043 | Blau | Mar. 16, 1937 |
| 2,286,386 | Silverman | June 16, 1942 |
| 2,297,251 | Schild | Sept. 29, 1942 |
| 2,390,187 | Sharpe | Dec. 4, 1945 |
| 2,551,417 | Carlisle | May 1, 1951 |
| 2,659,065 | Cordell | Nov. 10, 1953 |